(12) United States Patent
Lassen et al.

(10) Patent No.: US 10,346,324 B2
(45) Date of Patent: Jul. 9, 2019

(54) DEVICES AND METHODS FOR AUTONOMOUS HARDWARE MANAGEMENT OF CIRCULAR BUFFERS

(71) Applicant: Microchip Technology Incorporated, Chandler, AZ (US)

(72) Inventors: Jacob Lunn Lassen, Saupstad (NO); Morten Werner Lund, Flatasen (NO)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 15/874,704

(22) Filed: Jan. 18, 2018

(65) Prior Publication Data

US 2018/0232328 A1 Aug. 16, 2018

Related U.S. Application Data

(60) Provisional application No. 62/458,362, filed on Feb. 13, 2017.

(51) Int. Cl.
| | |
|---|---|
| *G06F 12/06* | (2006.01) |
| *G06F 13/12* | (2006.01) |
| *G06F 13/16* | (2006.01) |
| *G06F 13/24* | (2006.01) |
| *G06F 13/28* | (2006.01) |
| *G06F 13/42* | (2006.01) |

(52) U.S. Cl.
CPC ...... *G06F 13/1673* (2013.01); *G06F 12/0646* (2013.01); *G06F 13/122* (2013.01); *G06F 13/28* (2013.01); *G06F 13/4234* (2013.01); *G06F 13/4295* (2013.01); *G06F 13/24* (2013.01); *G06F 2212/1008* (2013.01); *G06F 2213/16* (2013.01); *Y02D 10/14* (2018.01); *Y02D 10/151* (2018.01)

(58) Field of Classification Search
CPC .... G06F 3/0655; G06F 3/0656; G06F 3/0658; G06F 2003/0691; G06F 5/16; G06F 12/0646; G06F 12/0835; G06F 12/1081; G06F 13/122; G06F 13/1673; G06F 13/24; G06F 13/28; G06F 13/32; G06F 13/4234; G06F 13/4295; Y02D 10/14; Y02D 10/151
See application file for complete search history.

(56) References Cited

U.S. PATENT DOCUMENTS

| | | | | |
|---|---|---|---|---|
| 4,991,217 A | * | 2/1991 | Garrett | ...................... G06F 3/16 704/235 |
| 5,875,289 A | * | 2/1999 | Woodruff | ................ G06F 13/28 710/22 |

(Continued)

OTHER PUBLICATIONS

Palmer, M.J. "DMA Controller". IBM Technical Disclosure Bulletin, vol. 34, No. 3. Aug. 1991. pp. 166-169. (Year: 1991).*

(Continued)

*Primary Examiner* — Thomas J Cleary
(74) *Attorney, Agent, or Firm* — TraskBritt (57) ABSTRACT

An autonomous circular buffer is described in connection with the various embodiments of the present disclosure. An autonomous circular buffer controller may control movement of data between a user of the autonomous circular buffer and a peripheral. The autonomous circular buffer may enable direct memory access type data movement, including between the user and the peripheral.

21 Claims, 9 Drawing Sheets

(56) References Cited

U.S. PATENT DOCUMENTS

| | | | | |
|---|---|---|---|---|
| 6,298,396 | B1* | 10/2001 | Loyer | G06F 13/385 710/22 |
| 7,809,873 | B2* | 10/2010 | Perry | G06F 13/28 710/110 |
| 8,402,180 | B2 | 3/2013 | Fredriksen et al. | |
| 9,256,399 | B2 | 2/2016 | Hanssen | |
| 2003/0131173 | A1* | 7/2003 | Cassidy | G06F 13/4221 710/308 |
| 2005/0223131 | A1* | 10/2005 | Goekjian | G06F 13/28 710/22 |
| 2009/0287857 | A1* | 11/2009 | Vu | G06F 13/28 710/22 |
| 2010/0161849 | A1* | 6/2010 | Suk | G06F 13/122 710/23 |
| 2011/0047309 | A1* | 2/2011 | Brinkmann | G06F 13/24 710/261 |
| 2011/0093629 | A1* | 4/2011 | Badi | G06F 9/30032 710/57 |
| 2012/0173772 | A1* | 7/2012 | Durand | G06F 13/28 710/22 |
| 2014/0149694 | A1* | 5/2014 | Lee | G06F 5/12 711/159 |
| 2016/0283421 | A1* | 9/2016 | Wilson | G06F 9/45558 |
| 2016/0371182 | A1* | 12/2016 | Herrmann | G06F 12/084 |
| 2017/0169537 | A1* | 6/2017 | Nemiroff | G06F 3/0416 |
| 2018/0232328 | A1* | 8/2018 | Lassen | G06F 13/1673 |

OTHER PUBLICATIONS

"DMA Controller". IP.com. Online Apr. 3, 2005. Retrieved from Internet Jan. 14, 2019. <https://priorart.ip.com/IPCOM/00012-1262 >. (Year: 2005).*

"IBM Technical Disclosure Bulletin". Wikipedia. Online Aug. 1, 2017. Retrieved from Internet Jan. 14, 2019. <https://en.wikipedia.org/wiki/IBM_Technical_Disclosure_Bulletin>. (Year: 2017).*

Anonymous: "Circular buffer—Wikipedia", Jun. 11, 2016 (Jun. 11, 2016), XP055389817, Retrieved from the Internet: URL:https://en.wikipedia.org/w/index.php?title=Circular buffer &oldid= 724 733214.

"Intersil 82C37A CMOS High Performance Programmable DMA Controller", Announcement Intersil, Mar. 1, 1997 (Mar. 1, 1997), pp. 192-215, XP002355367.

International Search Report for PCT Application No. PCT/US2018/015782 dated May 11, 2018, 5 pages.

Written Opinion of the International Searching Authority for PCT Application No. PCT/US2018/015782 dated May 11, 2018, 10 pages.

* cited by examiner

DEVICES AND METHODS FOR AUTONOMOUS HARDWARE MANAGEMENT OF CIRCULAR BUFFERS

CROSS-REFERENCE TO RELATED APPLICATION

This application claims the benefit under 35 U.S.C. § 119(e) of U.S. Provisional Patent Application Ser. No. 62/458,362, filed Feb. 13, 2017, the entire contents and disclosure of which is hereby incorporated herein by this reference.

TECHNICAL FIELD

Embodiments of the present disclosure relate generally to direct memory access control and more specifically to autonomous control of memory accesses to circular buffers for direct memory access.

BACKGROUND

In many embedded control systems and other computing systems movement of data between peripheral devices and a host, or between peripheral devices, may be a significant amount of data traffic on the various busses that may exist in such systems. Direct Memory Access (DMA) controllers may be used to manage these data transfers so the host does not need to manage movement of each data element. However, conventional DMA controllers still have significant overhead management that a host needs to perform and DMA controllers are generally more efficient only with bulk data transfers.

BRIEF SUMMARY

Various embodiments relate to methods of accessing data in memory. The methods may include allocating a circular buffer region of the memory for use by an autonomous circular buffer controller; transferring input data elements to the circular buffer region at subsequent input locations pointed at by an input pointer; and transferring output data elements from the circular buffer region at subsequent output locations pointed at by an output pointer. In one embodiment, each of the input pointer and the output pointer are configured to: update to point to a next data element location in the circular buffer region responsive to access to a current data element location; and wrap around to a beginning address of the circular buffer region responsive to an ending address of the circular buffer region being reached.

Other embodiments described herein relate to a system. The system may include a first interface, a second interface and an autonomous circular buffer controller. The first interface may be configured to communicate on a first bus for operable coupling with one or more peripheral devices and a host processor. The second interface may be configured to communicate on a second bus for operable coupling with a memory. The autonomous circular buffer controller may be configured to define and access a circular buffer region of the memory. The autonomous circular buffer may be further configured to: control a head pointer for stepping through the circular buffer region and wrapping around from an ending address to a beginning address; control a tail pointer for stepping through the circular buffer region and wrapping around from the ending address to the beginning address; move a first data element from the first interface to a location in the circular buffer region pointed at by the head pointer; and move a second data element from a location in the circular buffer region pointed at by the tail pointer to the first interface.

Other embodiments described herein relate to a system. The system may include a host processor, one or more peripherals, a first interface, and an autonomous circular buffer controller. The first interface may be configured to communicate on a first bus for operable coupling with the one or more peripheral devices and the host processor. The autonomous circular buffer controller may be configured to define and access a circular buffer region of the memory. The autonomous circular buffer may be further configured to: control a head pointer for stepping through the circular buffer region and wrapping around from an ending address to a beginning address; control a tail pointer for stepping through the circular buffer region and wrapping around from the ending address to the beginning address; and move a first data element from a location in the circular buffer region pointed at by the tail pointer to the first interface.

Other embodiments described herein relate to a system. The system may include a host processor, a first peripheral device and a second peripheral device. The second peripheral device may comprise a first interface configured to communicate on a bus operably coupled to the host processor and the first peripheral. In one embodiment, the second peripheral device is configured to provide a multichannel autonomous communication path between the host processor and first peripheral.

BRIEF DESCRIPTION OF THE DRAWINGS

Purposes and advantages of the embodiments of the disclosure will be apparent to one of ordinary skill in the art from the detailed description in conjunction with the accompanying drawings, including.

DETAILED DESCRIPTION

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

Embodiments described herein include autonomous hardware management of circular buffers in memory. The circular buffers are accessible by a host processor, one or more peripheral devices, or a combination thereof, without direct reference to the addresses of the circular buffer in memory. An autonomous circular buffer controller according to embodiments of the present disclosure may be configured to control a temporary storage that ensures an efficient asynchronous transfer of data between software tasks and hardware devices or between two hardware devices.

Most, if not all, embedded systems use buffering of data, usually in a separate memory. Buffering may be used to relax real time requirements, but may also be used to ensure sustainable throughput. In some systems, buffering may be implemented in hardware using a Direct Memory Access (DMA) controller, or in software.

DMA buffering is efficient in its general use of block data transfers, where a relatively large block of data is prepared before it is moved. The DMA process may be set up, after which the DMA process and hardware will handle the data movement to or from memory (e.g., between a peripheral such as a serial communication peripheral and a memory). This DMA process off-loads the host processor efficiently, but has overhead associated with managing the DMA controller, the buffers in memory, and determining when it is appropriate to perform the DMA operations. As a result, DMA processes only tend to be efficient for larger data chunks. Further, it is generally not feasible to start a DMA transfer until the entire data package is prepared, which may cause significant latency in the transfer and may subsequently mean that it is not possible to keep a sustained high throughput when using DMA. In addition, the buffering when using DMA is linear, meaning the DMA starts reading/writing from a start address, and stops when it comes to the end of the block, as this is when the transfer is completed.

When implementing buffering in software, linear buffers are also an option, but a circular buffer is usually more attractive as data may be written continuously to the circular buffer while data is being read from the circular buffer. Moreover, a circular buffer may handle burst blocks of data arriving or leaving like a conventional DMA process, but may also handle streaming data that may arrive or leave the circular buffer at more regular time intervals.

Figure 1:
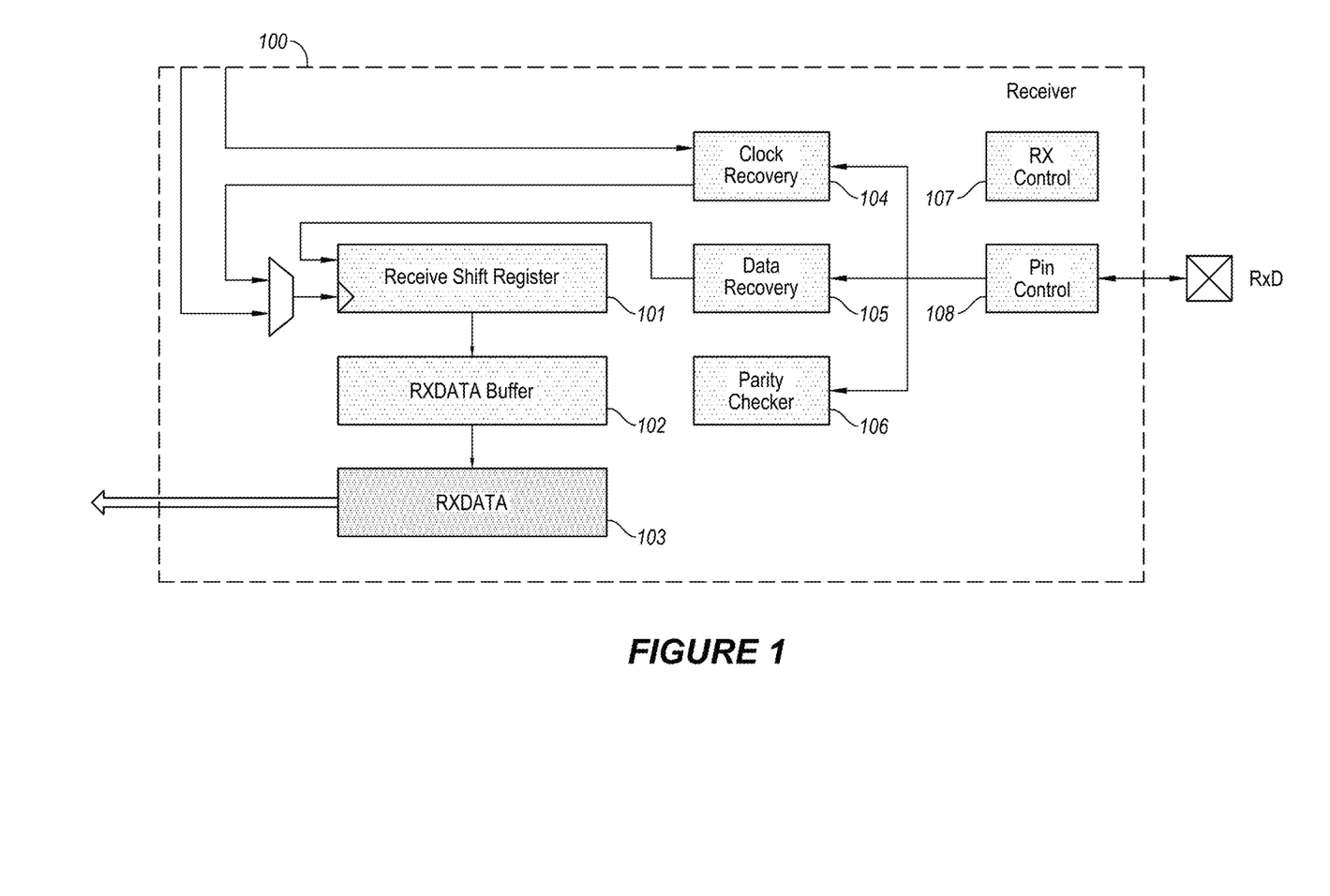
FIG. 1 is a block diagram of a universal synchronous/asynchronous receiver/transmitter configured as a receiver.

FIG. 1 is a block diagram of a Universal Synchronous/Asynchronous Receiver/Transmitter (USART) 100 configured as a receiver. Some systems are designed so that a certain level of buffering is added to the peripherals. This USART 100 includes a relatively small form of double buffering in the receive direction. The USART 100 includes a single-byte buffer (not shown) in a transmit direction, and a two-byte buffer 102 in a receive direction. This buffering relaxes the fundamental real-time requirements for communication between the serial bit-wise nature of a peripheral device and a host processor. Nevertheless, most peripheral drivers would still use additional buffering to reduce overhead requirements on the host processor.

Figure 2:
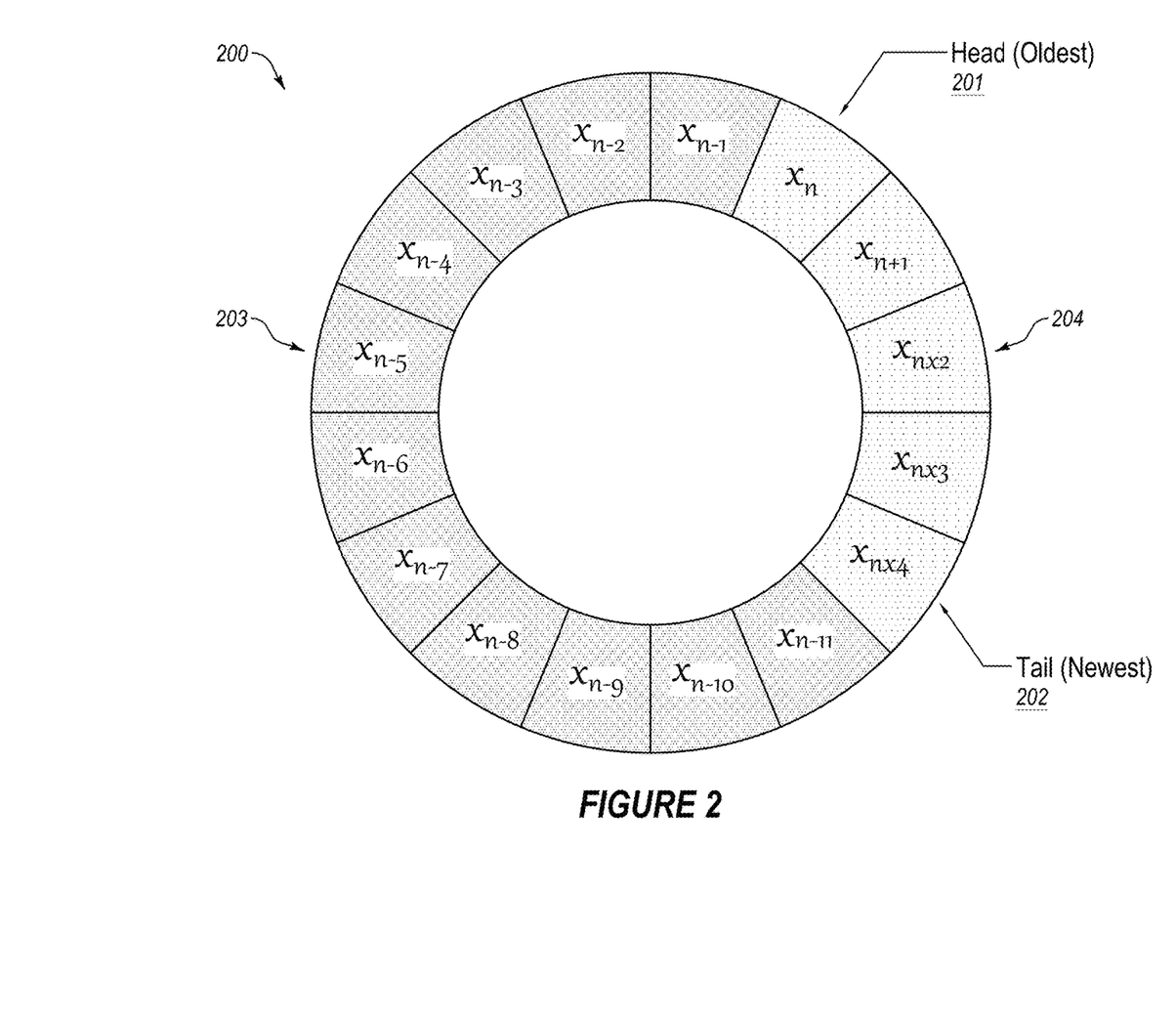
FIG. 2 is a conceptual diagram illustrating a circular buffer.

FIG. 2 is a conceptual diagram illustrating a circular buffer 200. A circular buffer 200 may be implemented as a First-In-First-Out (FIFO) buffer. The lightly shaded blocks 204 indicate locations that include valid data elements in the circular buffer. The darkly shaded block 203 indicate locations that are empty or locations where data elements have already been removed from the circular buffer 200.

A head pointer 201 (may also be referred to herein as an "input pointer") points to the most recently written data element. In this case, the head pointer 201 will be incremented (or decremented) to point to the next available location before the next input data element is written to the circular buffer 200. Alternatively, the head pointer 201 may be configured to point to the next available data location for writing to the circular buffer 200 (i.e., the location labeled $x_n$-11, which currently contains already removed data). In this case, the head pointer 201 will be incremented (or decremented) to point to the next available location after the current input data element is written to the circular buffer 200.

A tail pointer 202 (may also be referred to herein as an "output pointer") points to the location holding the oldest valid data element in the circular buffer 200 that is available for reading. In this case, the tail pointer 202 will be incremented (or decremented) to point to the next available location after the current output data element is read from the circular buffer 200.

In conventional systems, if a task or function in software running on a host processor writes a string to a USART such as the USART 100 shown in FIG. 1, the function would have to wait for the USART 100 to transmit the string until code execution may continue if not buffered. It is a so called "busy-wait" situation that stalls the program execution and impacts the real time performance of the system.

In contrast, if the function writing the string may write the string to a circular buffer such as a circular buffer 200, then a USART interrupt routine may fetch a new character from the circular buffer 200 whenever the USART 100 is ready to transfer the next byte. However, an issue with a conventional circular buffer is that the host processor still has to manage the circular buffer 200, which may cause unavoidable code overhead, both when writing data to the circular buffer 200 and when reading it out again.

Figure 3:
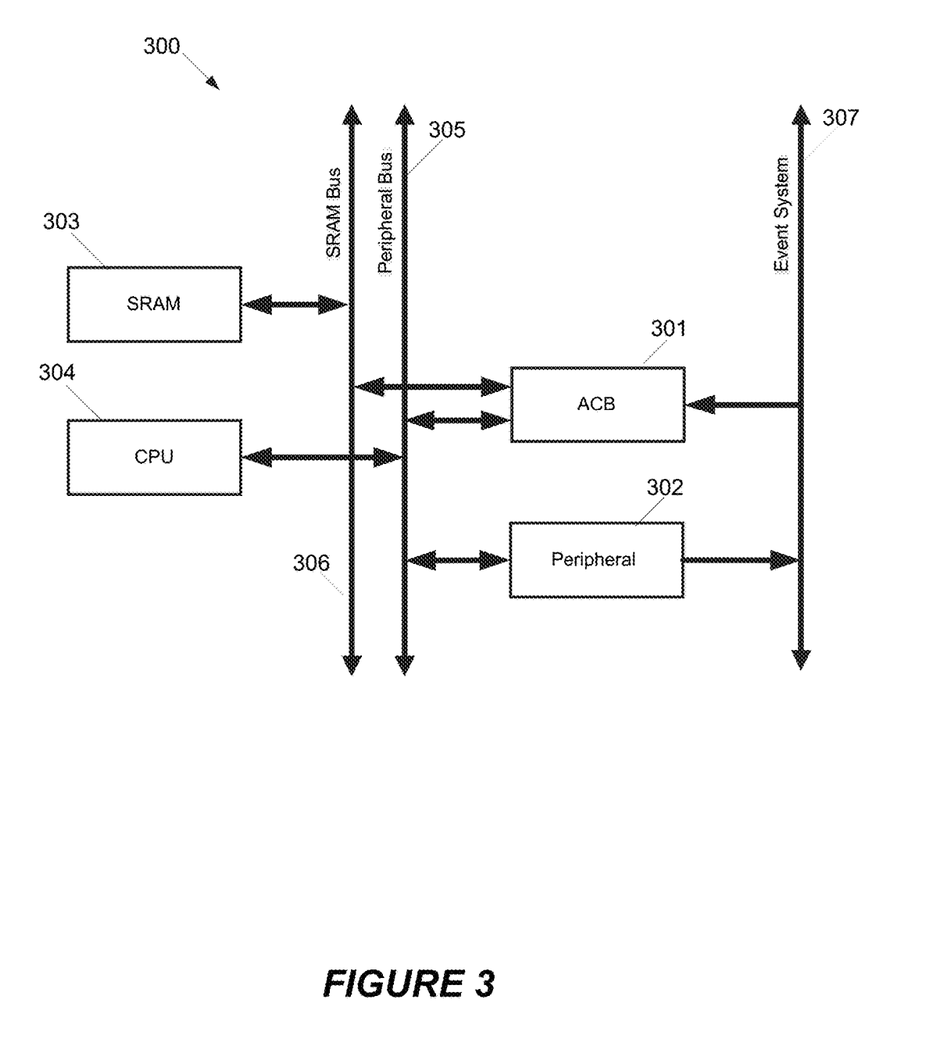
FIG. 3 is a block diagram of a computing system including a host processor, memory, a peripheral device, and an autonomous circular buffer controller.

FIG. 3 is a block diagram of a computing system 300 including a host processor 304, memory 303 (SRAM), a peripheral device 302, and an autonomous circular buffer (ACB) controller 301. As non-limiting examples, the computing system 300 may be a microcontroller-type embedded system, a user-type computer, a file server, a compute server, a notebook computer, a tablet, a handheld device, a mobile device, or other similar computer system for executing software. Computer, computing system, and server may be used interchangeably herein to indicate a system for practicing embodiments of the present disclosure. The computing system 300 is configured for executing software programs containing computing instructions and includes one or more processors, memory, storage, user interface elements, and one or more communication elements.

The host processor 304 is a Central Processing Unit (CPU) that may be configured for executing a wide variety of operating systems and applications including computing instructions for carrying out all or portions of embodiments of the present disclosure.

The memory 303 may be used to hold computing instructions, data structures, and other information for performing a wide variety of tasks including performing embodiments of the present disclosure. By way of example, and not limitation, the memory may include Synchronous Random Access Memory (SRAM), Dynamic RAM (DRAM), Read-Only Memory (ROM), Flash memory, and the like.

The memory 303 may include other types of memory devices, including volatile storage devices or non-volatile storage devices, configured to store information. Examples of other types of memory include nano RAM or (NRAM), nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), magnetoresistive RAM (MRAM), phase change RAM (PCRAM), phase change memory, or other solid-state storage media.

In the illustrated embodiment, the host device (i.e., CPU) 304 communicates with a memory 303 (i.e., SRAM) on an SRAM bus 306. Also, the CPU 304 communicates with peripheral devices 302 on a peripheral bus 305. The peripheral devices 302 may also be coupled to an event system bus 307. Additional details regarding one type of event system and event bus, as well as overall microcontroller system configurations, may be found in U.S. Pat. No. 9,256,399 entitled "BREAKING PROGRAM EXECUTION ON EVENTS," filed on Jun. 27, 2013, the disclosure of which is incorporated herein in its entirety by this reference.

The ACB controller 301 is configured to communicate on the SRAM bus 306, the peripheral bus 305, and the event system bus 307.

Of course, a person having ordinary skill in the art will recognize that embodiments of the present disclosure may be used in other system configurations. For example, embodiments may be configured in a computer type system using an interrupt type system for the event controls. Moreover, this type of system may have a separate bus (e.g., an Input/Output bus) for communication between the CPU 304 and any peripheral devices 302. In addition, this type of system may include the ACB controller 301 as communicating on the memory bus (i.e., SRAM bus) 306, which may be coupled directly with the memory 303 and CPU 304, and communication with the peripheral devices 302 on such an I/O bus.

Many other system configurations are possible for embodiments of the present disclosure. Additional details regarding one type of microcontroller system configuration, may be found in U.S. Pat. No. 8,402,180 entitled "AUTONOMOUS MULTI-PACKET TRANSFER FOR UNIVERSAL SERIAL BUS," filed on Mar. 26, 2010, the disclosure of which is incorporated herein in its entirety by this reference.

FIG. 3 is a detailed block diagram of the ACB controller 301, in accordance with embodiments of the present disclosure. The ACB controller 301 may be configured as a controller for temporary storage that ensures an efficient asynchronous (or synchronous) transfer of data between software tasks and hardware devices or between two hardware devices (for example, two peripherals).

In short, while DMA is good for large blocks of data, it lacks the capability and/or has drawbacks when handling single bytes like a circular buffer and misses the capability of initiating the data move before an entire package has been assembled. Software implemented circular buffers may include significant overhead to handle both write to and read from pointers and processes. Moreover, software implemented circular buffers do not, like the DMA, handle the transaction to/from a peripheral autonomously (e.g., without oversight by a host processor).

With the ACB controller 301 of the present disclosure, overhead processes that might have been handled by the CPU 304 of the control system 300 may be off-loaded by implementing an ACB in hardware that may operate in close collaboration with other peripherals, such as communication modules, timers, Analog-to-Digital Controllers (ADCs) and Digital-to-Analog Controllers (DACs). Such an ACB may act similar to a traditional DMA (i.e., be set up to handle linear data) and it may be set up to "wrap" once the end of the data has been reached and start over again. This process may be particularly useful when generating waveforms from, for example, a DAC.

Note that an ACB controller and circular buffer region in memory may be collectively referred to herein as an autonomous circular buffer (ACB).

In embodiments of the present disclosure, the ACB controller 301 controls a circular buffer in memory 303 (or another memory) that is inserted between the peripheral device 302 and the CPU 304, so that instead of letting the CPU 304 write to the peripheral device 302, the CPU 304 writes to the circular buffer. When the peripheral device 302 is ready to receive data, the ACB controller 301 may move data from the circular buffer in memory 303 to the destination (e.g., the peripheral device 302) as long as there is data in the circular buffer. These transfers from the CPU 304 to the circular buffer and from the circular buffer to the peripheral device 302 may occur sequentially or may occur in parallel as long as there is valid data in the circular buffer.

Of course, transfers may happen the other direction. In other words, the ACB controller 301 may move data coming from the peripheral device 302 to the circular buffer and from the circular buffer to the CPU 304.

An ACB controller 301 may not automatically transfer all the data to a destination, but rather manage the circular buffer and thereby reduce the software overhead significantly. In that configuration an ACB may be accessed as a peripheral module: it is possible to read or write bytes through a register interface, while the DMA functionality of the ACB (i.e., the ACB controller 301) is actually storing/fetching the data in/from an SRAM (i.e., memory 303) fully transparently to the software process on the CPU 304. The CPU 304 does not need to relate to an actual memory access operation to the SRAM. Rather, the CPU just writes to, or reads from, one specific address in the ACB.

Figure 4:
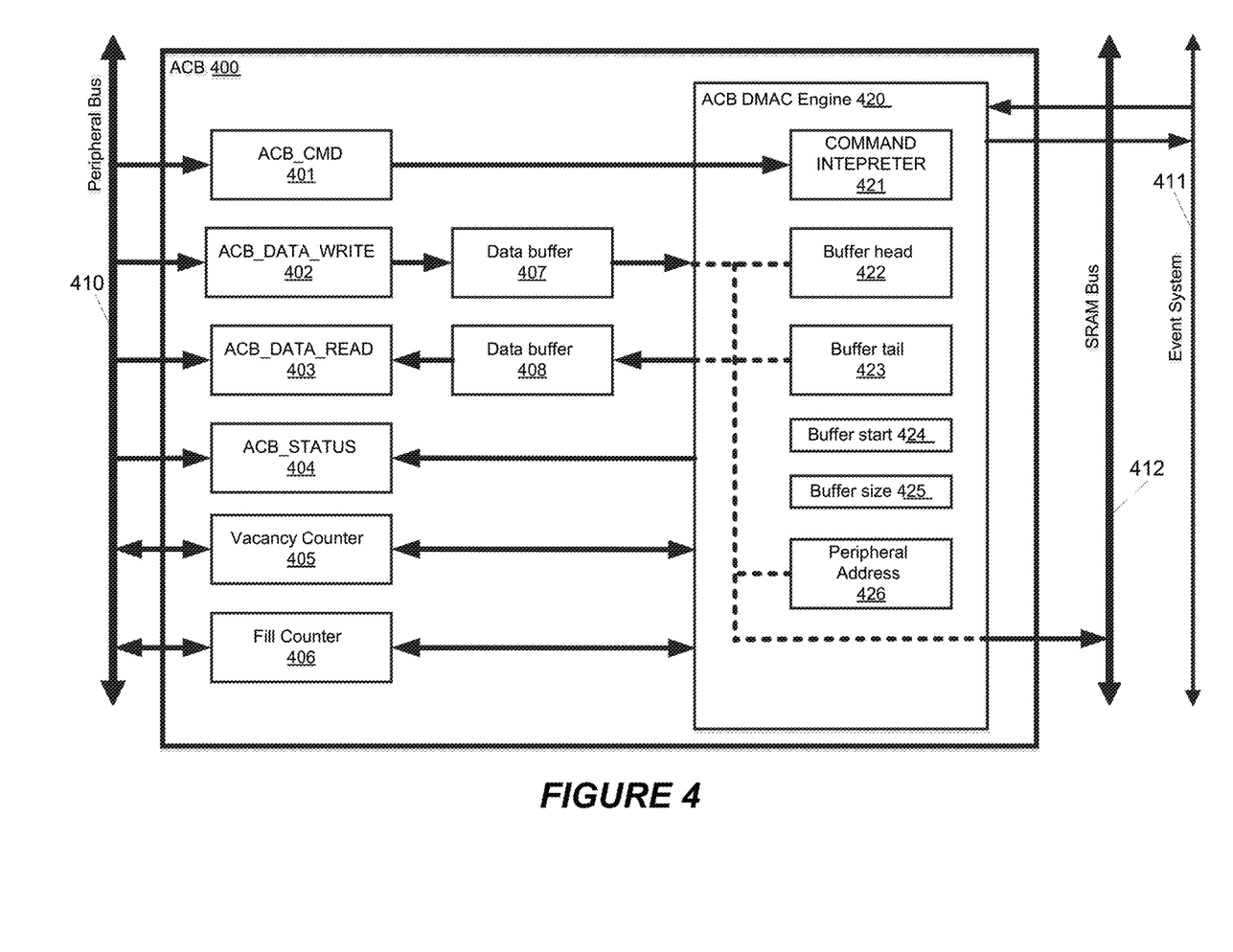
FIG. 4 is a detailed block diagram of the autonomous circular buffer controller.

Turning to FIG. 4, for example, in a peripheral to host data transfer, a peripheral writes to the ACB_DATA_WRITE register 402. A write data buffer 407 may be coupled to the ACB_DATA_WRITE register 402 to hold the data before it is written to the circular buffer region in SRAM. ACB controller 420 may use a value in the buffer head register 422 to write the data to the proper location in the circular buffer region of the SRAM. The data may come from the data buffer 407, if present, or directly from the ACB_DATA_WRITE register 402. Incrementing, decrementing, and wrap-around of the Buffer head register 422 is explained above with reference to FIG. 2 and supplemented with the description below with reference to FIG. 5.

In the background (i.e., not seen or managed by the host or peripheral), the ACB controller 420 may use a value in the buffer tail register 423 to read data from the proper location in the circular buffer region of the SRAM. The data may be placed in a read data buffer 408, if present, or directly in an ACB_DATA_READ register 403. Incrementing, decrementing, and wrap-around of the buffer tail register 423 is explained above with reference to FIG. 2 and supplemented with the description below with reference to FIG. 5.

When the host begins to read data it reads only from the ACB_DATA_READ register 403 with the ACB controller 420 managing all the accesses from the circular buffer region of the SRAM and providing the data through the ACB_DATA_READ register 403.

Data movement may also occur in the other direction from the host to the peripheral device. In such cases, the host writes to the ACB_DATA_WRITE register 402 and the peripheral device reads from the ACB_DATA_READ register 403.

Finally, data movements may occur between two peripheral devices rather than between a peripheral device and the host.

The ACB controller 420 may include registers to indicate where in memory the ACB controller 420 should place the circular buffer region. As one example, the registers may include a buffer start register 424 and a buffer size register 425 as shown in FIG. 4. Other embodiments may use a buffer end register rather than a buffer size register 425, or any other combination of registers to identify the extents of the circular buffer.

ACB 400 may include a status register 404 that provides information about available room in the circular buffer, number of bytes stored in the circular buffer, and so on. A vacancy counter 405 may be included to indicate how many data elements in the circular buffer are not presently used. Similarly, a fill counter 406 may be included to indicate how many data elements in the circular buffer currently include valid data.

The ACB 400 may include a control or command register 401 and the ACB controller 420 may include a command interpreter 421 that may be used to control the access type (e.g., peek, write/read leading data element, write/read tailing data element, etc.).

The ACB controller 420 is thus able to collaborate with the peripherals. For example, the ACB controller 420 "understands" the state of a peripheral, and thereby knows if a peripheral is ready to transmit output data. Similarly, the ACB controller 420 "understands" if a peripheral has received new data, and may collect this data and place it in the circular buffer. On reception, the ACB controller 420 may be configured to notify a CPU (or another peripheral) that new data is available, and a CPU may then inspect the status register 404 to know how much data is available and collect the data from the ACB 400. The ACB controller 420 may be set up to use the event system 411 to notify the CPU or peripheral on each data element or for a package of a given size.

An extension of the ACB controller 420 may be configured to make it protocol aware, by configuring it so that it knows which byte(s) in the protocol contains information about the package size and the data location within the packet. This may allow the ACB 400 to only interrupt a CPU when an entire package is received, and thus save CPU bandwidth and reduce power consumption.

Figure 5:
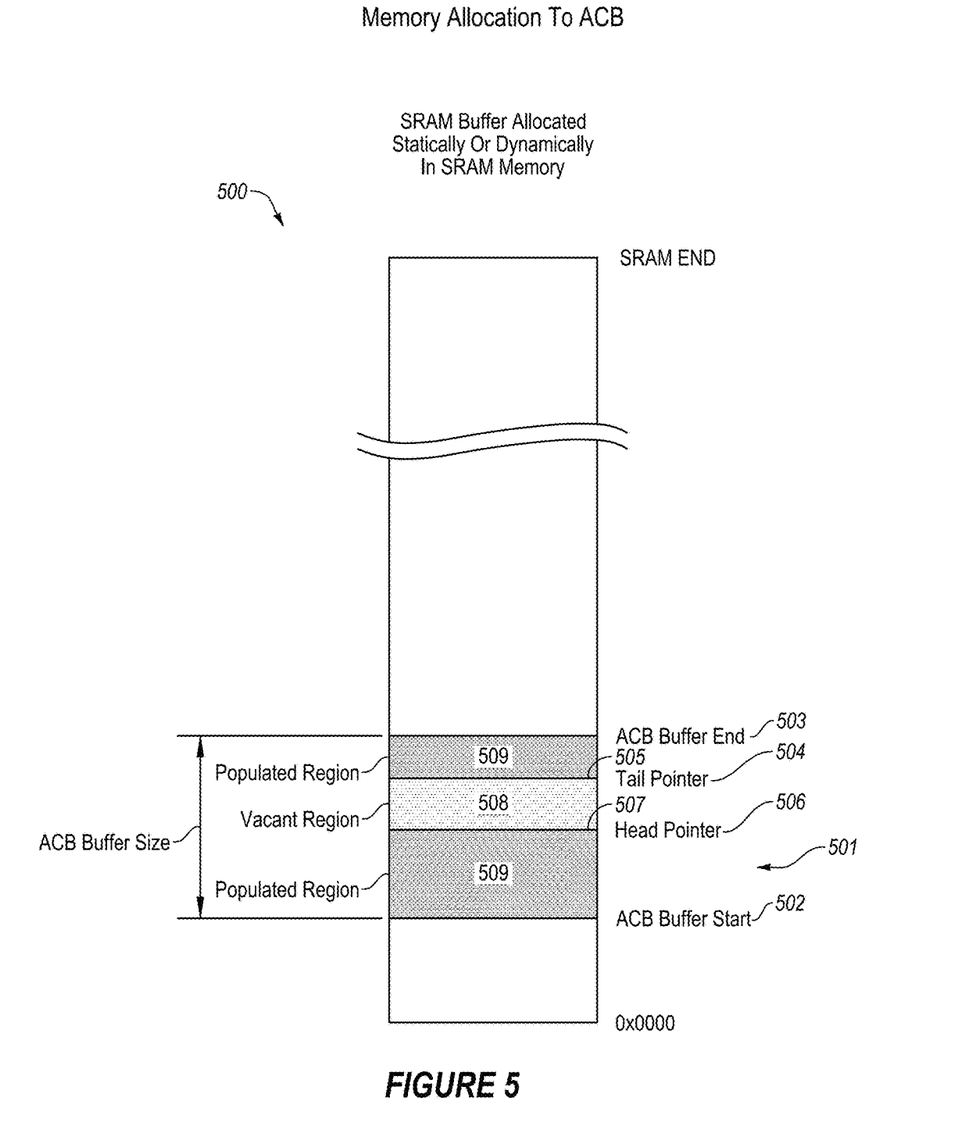
FIG. 5 illustrates an example memory map showing a circular buffer region in a memory map.

FIG. 5 is an example memory map 500 showing a circular buffer region 501 in a memory map. The circular buffer region 501 extends from an ACB buffer start location 502 to an ACB buffer end location 503. A tail pointer 504 points to the next available location 505 for reading data and head pointer 506 points to the next available write location 507.

A lightly shaded region shows a vacant region 508 within the circular buffer region 501 and darkly shaded regions show populated regions 509 in the circular buffer region 501 that include currently valid data. Thus, one may see that the head pointer 506 has reached the end of the circular buffer region 501 and has wrapped around to the buffer start location 502 and filled in data from the buffer start location 502 up to the current head pointer location 507. As the tail pointer 504 increments when data is read out, the tail pointer 504 will also wrap around to the buffer start location 502 to continue reading valid data from the populated region 509.

The example in FIG. 5 shows the tail pointer and head pointer incrementing for each data access and wrapping around from the buffer end to the buffer start. Alternatively, the tail pointer and head pointer could be configured to decrement and wrap from the buffer start to the buffer end.

Figure 6:
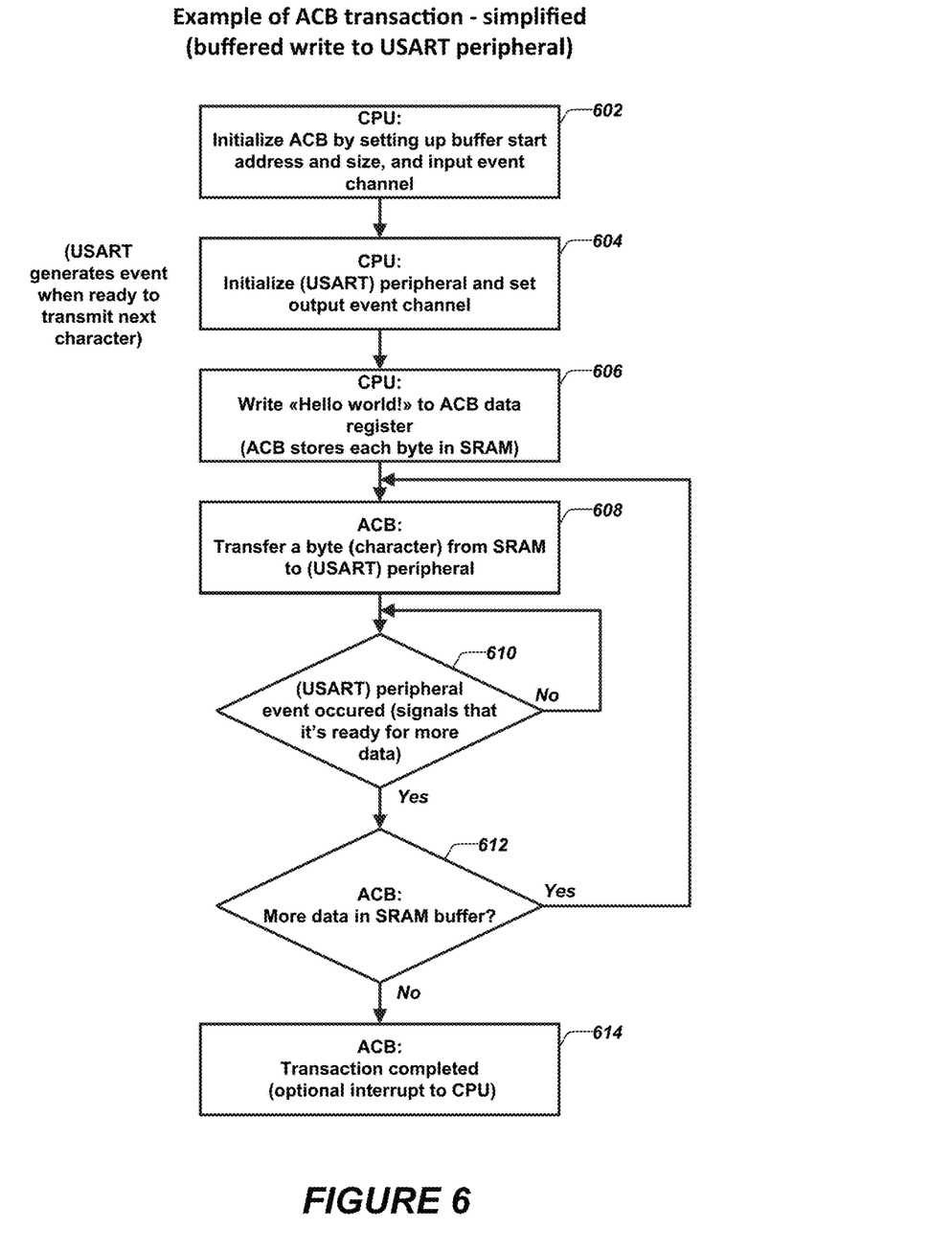
FIG. 6 is a flow diagram illustrating processes associated with configuring and using the autonomous circular buffer.

FIG. 6 is a flow diagram illustrating processes associated with configuring and using the autonomous circular buffer. At process block 602, the CPU initializes the ACB controller by setting up a buffer start address and size and the input event channel. At process block 604 the CPU initializes a USART peripheral and sets the output event channel.

At process block 606 the CPU writes a character string "Hello world" to the ACB data write register. The ACB controller then stores the character string in the circular buffer region of the SRAM.

At process block 608 the ACB controller transfers a byte from the SRAM to the USART peripheral. Decision block 610 indicates a test to see if a USART peripheral event has occurred. If not, the process loops to wait for the event.

If the event has occurred, decision block 612 indicates a test to see if there is more valid data in the circular buffer region of the SRAM. If so, the process loops back to process block 608 to transfer additional data to the USART.

If the circular buffer region of the SRAM is empty, process block 614 indicates that the transaction is complete and an optional interrupt may be sent to the CPU.

Figure 7A:
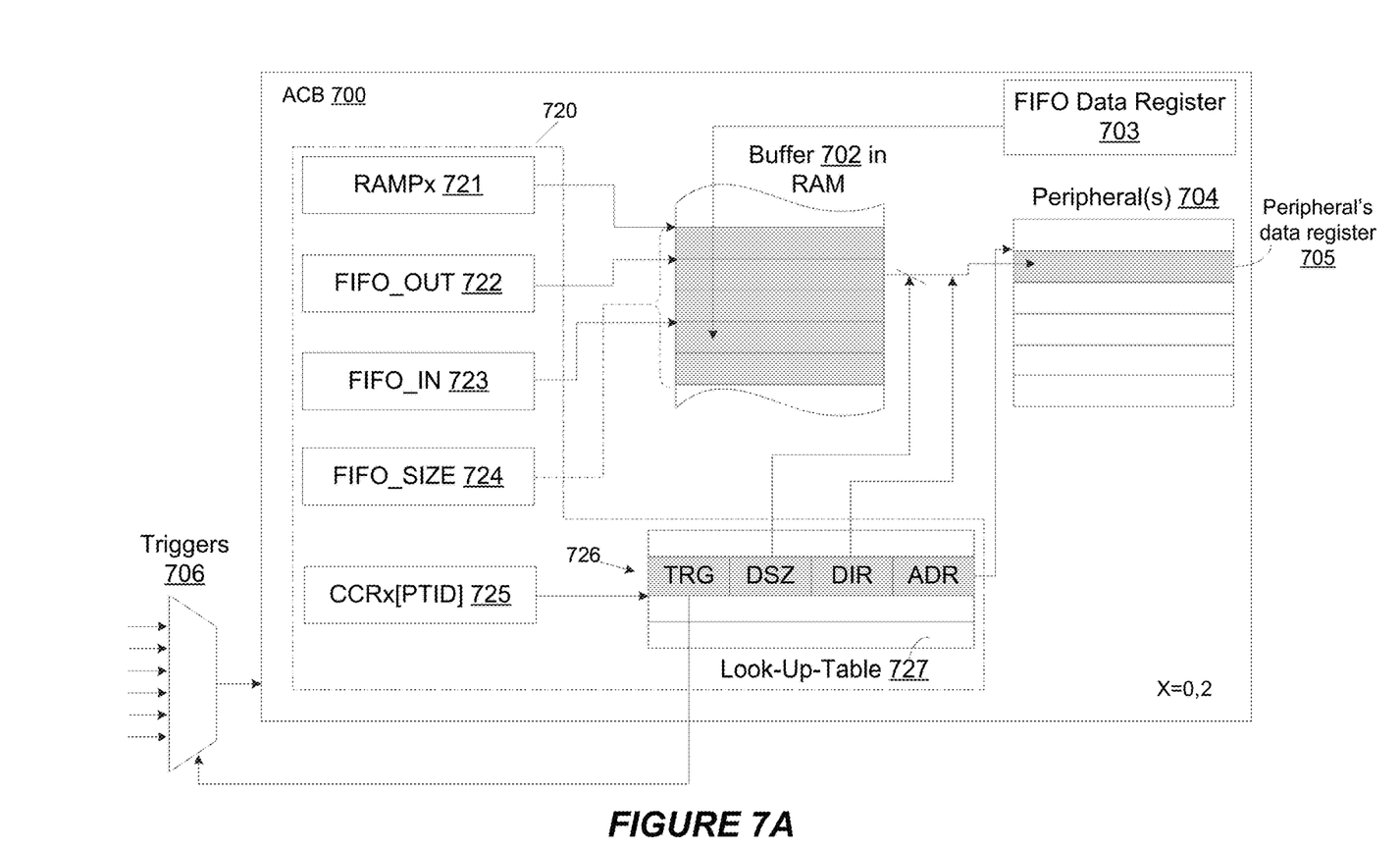
FIGS. 7A and 7B are block diagrams of an autonomous circular buffer controller that shows data movement.
Figure 7B:
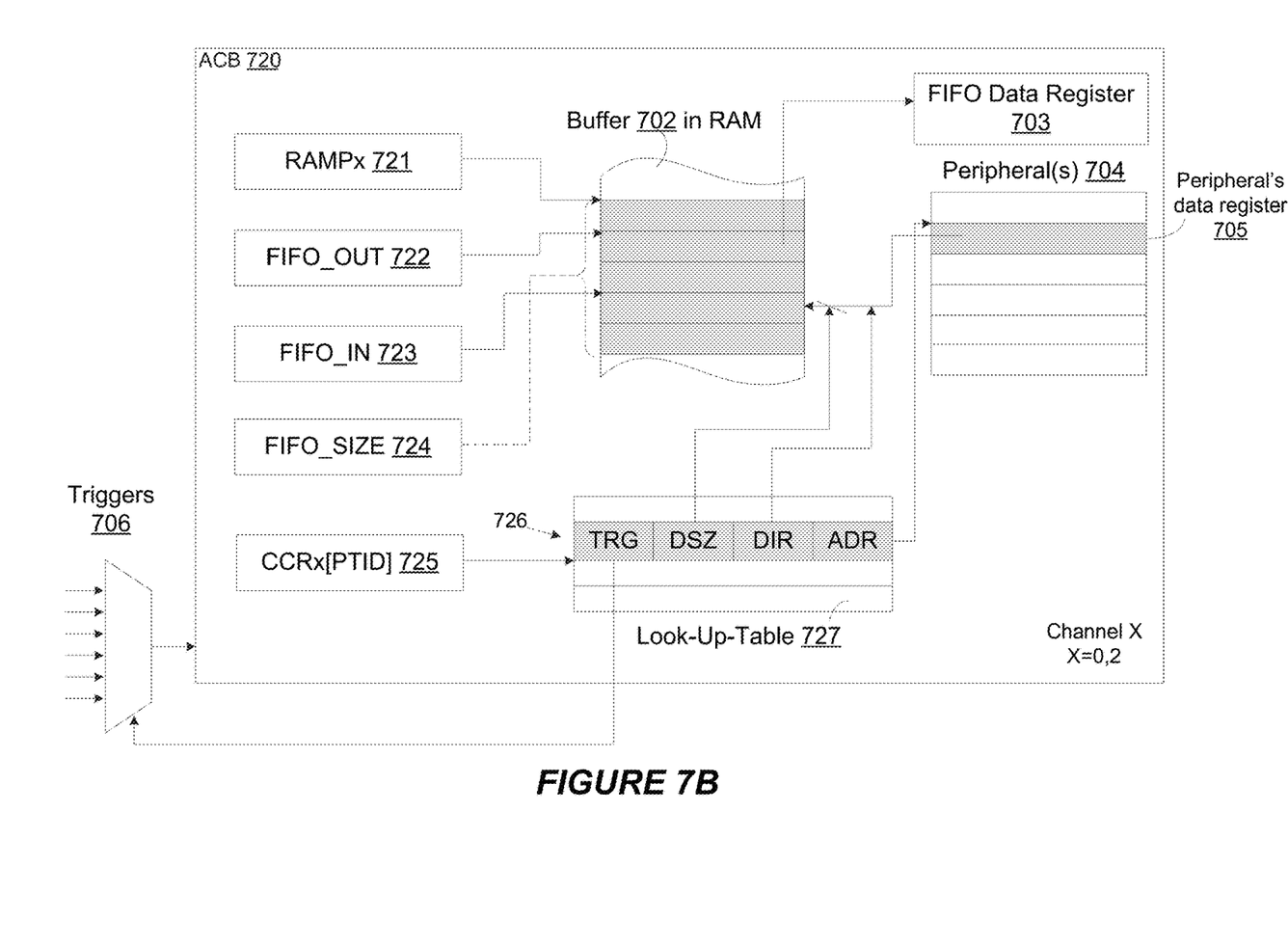

FIGS. 7A and 7B are detailed block diagrams of an ACB 700 that includes an ACB controller 720 implementing an N-level first-in-first-out (FIFO) buffer 702 in RAM, in accordance with embodiments of the present disclosure.

FIG. 7A shows the direction of data movement in a READ operation, i.e., where a CPU (not shown) writes data to the ACB 700 as if it is a peripheral and the peripheral 704 receives data from the ACB 700. When the peripheral 704 is ready to receive data, the ACB controller 720 may move data from the buffer 702 to a data register 705 of the peripheral 704 as long as there is data in the buffer 702. The transfers from a CPU to the ACB 700 and from the ACB 700 to the peripheral 704 may occur sequentially or may occur in parallel as long as there is valid data in the buffer 702. In one embodiment, the ACB controller 720 does not immediately transfer the data to the peripheral 704, but waits to transfer the data upon receiving an event notification that the peripheral 704 is available.

For example, in a user (e.g., a CPU) to peripheral data transfer, the user writes to the FIFO data register 703. In one embodiment, the ACB controller 720 may include a control register (CCRx) 725, and may update one or more control register bits (or bytes) 726, e.g., TRG, DSZ, DIR, and ADR. In one embodiment, the control register bits 726 may be configured to be a status interface. In one embodiment, the ACB controller 720 may represent several channels and may use a look-up-table 727 responsive to a channel identifier (e.g., PTID) to access the control register bits 726.

In one embodiment, the value in the DSZ register may indicate the size of the data to be read from the buffer 702; the value in the DIR register may indicate the direction of the data transfer (e.g., CPU read/CPU write); the value in the ADR register may indicate the address of the peripheral's data register 705; and the value in the TRG register may indicate the event channel used to trigger the transfer.

The ACB controller 720 may set up the buffer 702 based on values stored at the FIFO_IN register 723, FIFO_OUT register 722 and FIFO_SIZE register 724. The value in the FIFO_IN register 723 is indicative of a buffer tail pointer and the value in the FIFO_OUT register 722 is indicative of a buffer head pointer.

The ACB controller 720 may use a value in the FIFO_IN register 723 to write the data to the proper location in the buffer 702 of the RAM. The data may come from the FDR 703. The ACB controller 720 may use the data in the DIR register to determine that there is data available to read from the FDR 703 and write to the buffer 702. The ACB controller 720 may write the data in the buffer 702 to the peripheral's data register 705 responsive to the value in the TRG control register. When the peripheral 704 is ready, the ACB controller 720 may use an address in the ADR register to write the data to the proper data register 705 of the peripheral 704.

In various embodiments, one or more of the control bits of the control register 726 of the ACB controller 720 (e.g., DSZ, DIR, ADR) may be available to the peripheral or CPU, for example, in a peek( ) operation.

FIG. 7B shows the direction of data movement in a WRITE operation, i.e., the ACB controller 720 moves data coming from the peripheral 704 to the buffer 702 and from the buffer 702 to a CPU. Responsive to receiving a command 'PTID' and comparing it to entries in a look-up-table 727, the ACB controller 720 may update one or more control register bits 726, TRG, DSZ, DIR, and ADR.

The ACB controller 720 may use a value in the FIFO_IN register 723 to write the data to the proper location in the buffer 702 of the RAM. The data may come from the peripheral's data register 705. The ACB controller 720 may use the data in the DIR register to determine that there is data available to read from the buffer 702, and use the values in the FIFO_OUT register 722 and DSZ register to read the data from the proper locations in the buffer 702 of the RAM. The ACB controller 720 may write the data read from the buffer 702 to the FIFO data register 703. In one embodiment, an optional interrupt may be asserted to indicate to the CPU that the data is available in the FIFO data register 703.

Figure 8:
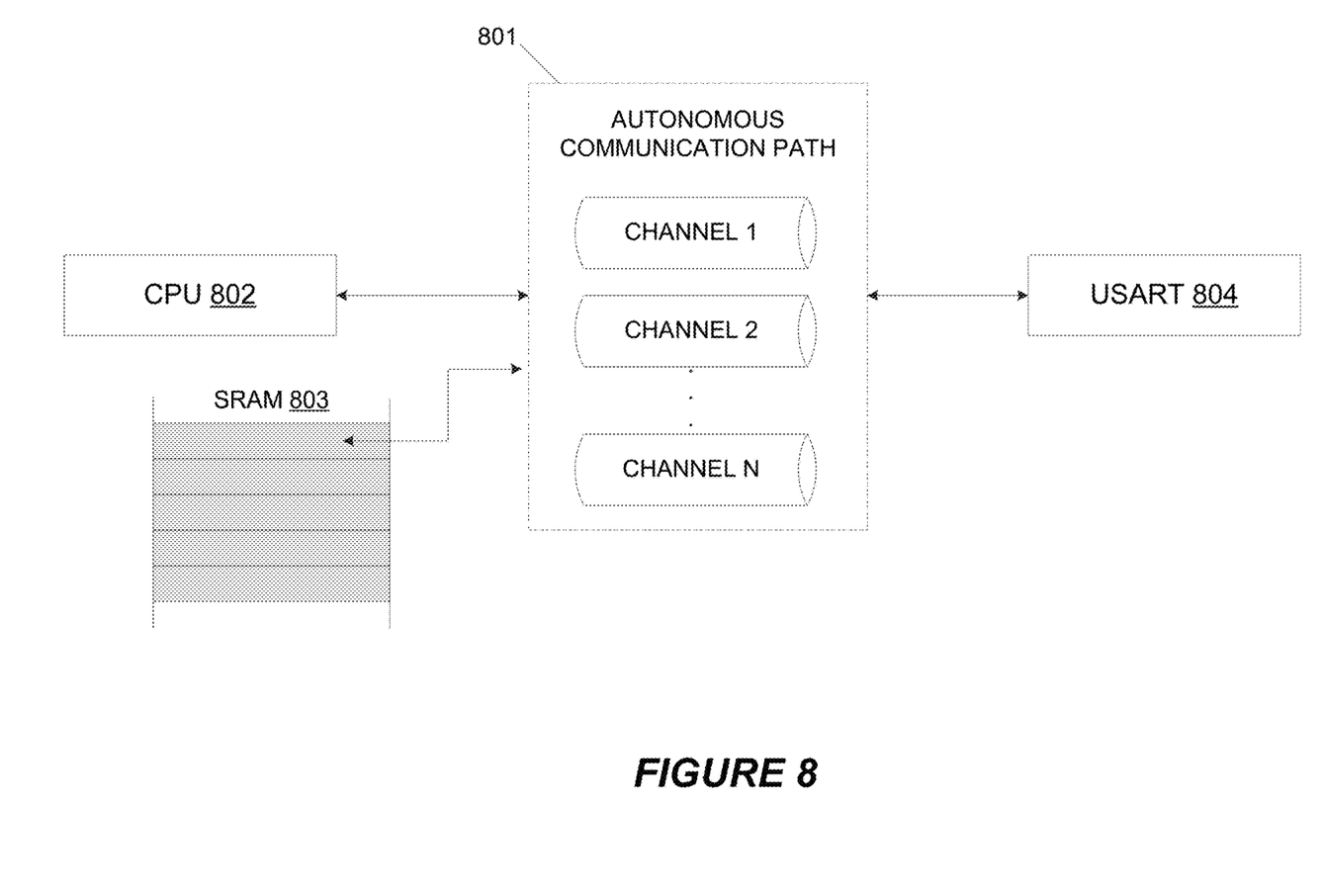
FIG. 8 is a block diagram of an autonomous communication path between a CPU and a peripheral.

An ACB controller 720 described with reference to FIGS. 7A and 7B may be used to implement an autonomous communication path between two users. FIG. 8 is a block-diagram of an n-channel autonomous communication path (ACP) 801 between CPU 802 and RAM 803 on one side and a USART 804. Each channel may be an ACB 700 and ACB controller 720 of the type shown in FIGS. 7A and 7B, respectively. The USART has bi-directional communication requirements, and so at least one channel of the ACP 801 may facilitate read communication and at least one other channel of the ACP 801 may facilitate substantially simultaneous write communication. Communication may be initiated responsive to a CPU issuing a DMA request for data transfer from the SRAM 803 to the USART 804. The ACP 801 handles the read/write operations, saving the CPU from the burdensome task of transferring using programmed I/O that are typically too small to justify the set-up overhead for a conventional DMA controller.

The ACP 801 may be used with any peripheral that includes a buffer or would benefit from a buffer. Additional channels may be added as needed, including to implement control features for the other channels (e.g., transferring a descriptor for the next DMA request in the queue).

While FIG. 8 shows multi-channel communication between two users, in some embodiments, the ACP may facilitate communication from one to many destinations, e.g., each channel may be configured to facilitate communication to a number of different peripherals. The ACP may also facilitate communication from many to one destination. In another embodiment, the ACP may be configured to enable high-bit-rate communication by providing several channels that may be simultaneously written to and read from, for example, between two peripherals.

A person having ordinary skill in the art would recognize that this process could move data in the other direction from a peripheral device to the CPU. Alternatively, the process could move data between two peripheral devices. It should also be pointed out that while not directly illustrated, data movement in process block 606 and data movement in process block 608 may overlap such that some of the character string "Hello world" may begin moving to the USART before the character string is fully written by the CPU.

For the most part, data movement has been discussed herein in terms of bytes. However, embodiments of the present disclosure may be configured with many other sizes for individual data elements such as, for example, 16-bit words, 32-bit words, 64-bit words, and DRAM burst-length data elements.

In summary, in embodiments of the present disclosure, a CPU is offloaded from handling buffering in software, which impacts the maximum throughput, and affects the real time performance of the system. Further, implementing an ACB controller allows a CPU to enter low power mode during transmissions.

Thus, an ACB controller may reduce power consumption, increase sustainable throughput, and improve system responsiveness as the CPU is not stalled for polling and not busy performing other buffer management processes. The ACB controller may eliminate undetected buffer-over/underrun situations and perform faster buffer read/writes.

With the ACB controller, a register interface simplifies access, buffer management is handled in hardware (head/tail pointers etc.), and support may be provided for typical functions such as get( ) put( ) peek( ) flush( ) and so on. SRAM may be used to store data and a DMA-like functionality moves data from ACB registers to a circular buffer in SRAM.

The ACB controller may improve access and add buffering to many peripherals to improve many embedded control functions such as DAC, ADC, and pulse-width modulation controls.

An ACB controller: automates data-moves to/from peripherals, relaxes real-time requirements, improves system response time due to fewer interrupts, enables increased and sustained through-put on communication peripherals, enables advanced waveform generation with minimal CPU intervention, allows sophisticated interaction between peripherals (e.g., if ADC result>x, load next value pulse width modulated (PWM) signal into a DAC).

Many of the functional units described in this specification may be labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software, stored on a physical storage device (e.g., a computer-readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer-readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM), which may store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

What is claimed is:

1. A method of accessing data in a memory, comprising:
   allocating a circular buffer region of the memory for use by an autonomous circular buffer controller circuitry;
   initiating transfer of input data elements, by the autonomous circular buffer controller circuitry, to the circular buffer region at subsequent input locations pointed at by an input pointer; and
   initiating transfer of output data elements, by the autonomous circular buffer controller circuitry, from the circular buffer region at subsequent output locations pointed at by an output pointer;
   wherein each of the input pointer and the output pointer are configured to:
      update to point to a next data element location in the circular buffer region responsive to access to a current data element location; and
      wrap around to a beginning address of the circular buffer region responsive to an ending address of the circular buffer region being reached.

2. The method of claim 1, wherein:
   the input pointer and the output pointer being equal indicates that the circular buffer region is empty; and
   the input pointer and the output pointer being unequal indicates that the circular buffer region includes valid data.

3. The method of claim 1, wherein the transferring input data elements and the transferring output data elements both occur while the circular buffer region is not empty and not full.

4. The method of claim 1, wherein transferring input data elements to the circular buffer region at subsequent input locations pointed at by an input pointer comprises transferring input data elements from a register interface to the circular buffer region.

5. The method of claim 1, wherein transferring output data elements from the circular buffer region at subsequent output locations pointed at by an output pointer comprises receiving an event notification indicating that a peripheral is available.

6. The method of claim 1, further comprising:
   detecting, by the autonomous circular buffer controller circuitry, valid input data elements in the circular buffer region; and
   the initiating the transfer of the input data elements responsive to the detecting.

7. The method of claim 1, further comprising:
   receiving, from a host processor, the input data elements at the autonomous circular buffer controller circuitry.

8. A system, comprising:
   a first interface for communicating on a first bus for operable coupling with one or more peripheral devices and a host processor;
   a second interface for communicating on a second bus for operable coupling with a memory; and
   an autonomous circular buffer controller circuitry for defining and accessing a circular buffer region of the memory and configured to:
      control a head pointer for stepping through the circular buffer region and wrapping around from an ending address to a beginning address;
      control a tail pointer for stepping through the circular buffer region and wrapping around from the ending address to the beginning address;
      initiate moving a first data element from the first interface to a location in the circular buffer region pointed at by the head pointer; and
      initiate moving a second data element from a location in the circular buffer region pointed at by the tail pointer to the first interface.

9. The system of claim 8, further comprising the host processor and the one or more peripheral devices and wherein:
   the first data element is received from at least one peripheral device of the one or more peripheral devices; and
   the second data element is sent to the host processor.

10. The system of claim 8, further comprising the host processor and the one or more peripheral devices and wherein:
    the first data element is received from the host processor; and
    the second data element is sent to at least one peripheral device of the one or more peripheral devices.

11. The system of claim 10, wherein the one or more peripheral devices are selected from a group comprising: a universal synchronous/asynchronous receiver-transmitter, a universal asynchronous receiver-transmitter, and a digital-to-analog converter, an analog-to-digital converter.

12. The system of claim 8, wherein the autonomous circular buffer controller circuitry is configured to receive an indicator of a direct memory access request for one of the one or more peripheral devices.

13. The system of claim 8, wherein the first interface, second interface, and autonomous circular buffer controller circuitry are incorporated into the one or more peripheral devices.

14. A system, the system comprising:
a host processor;
one or more peripheral devices;
a first interface for communicating on a first bus for operable coupling with the one or more peripheral devices and the host processor; and
an autonomous circular buffer controller circuitry for defining and accessing a circular buffer region a memory and configured to:
control a head pointer for stepping through the circular buffer region and wrapping around from an ending address to a beginning address;
control a tail pointer for stepping through the circular buffer region and wrapping around from the ending address to the beginning address; and
initiate moving a first data element from a location in the circular buffer region pointed at by the tail pointer to the first interface.

15. The system of claim 14, wherein the host processor is configured to write the first data element to the circular buffer region.

16. The system of claim 15, wherein the autonomous circular buffer controller circuitry moves the first data element from the location in the circular buffer region responsive to an interrupt.

17. The system of claim 14, wherein the autonomous circular buffer controller circuitry is configured to move a second data element from the one or more peripheral devices to the circular buffer region pointed at by the head pointer and notify the host processor that data is available in the circular buffer region.

18. The system of claim 17, wherein the autonomous circular buffer controller circuitry includes one or more status registers that are accessible by a CPU.

19. The system of claim 18, wherein a first value stored in the one or more status registers is indicative of a size of the second data element.

20. An embedded system, comprising:
a host processor;
a first peripheral device; and
a second peripheral device, the second peripheral device comprising a first interface configured to communicate on a bus operably coupled to the host processor and the first peripheral device, wherein the second peripheral device is configured to:
provide a multichannel autonomous communication path between the host processor and first peripheral device; and
initiate moving data from a circular buffer in the multichannel autonomous communication path to the first interface.

21. The embedded system of claim 20, wherein the host processor is part of a microcontroller and the first peripheral device is a digital-to-analog converter or an analog-to-digital converter.

* * * * *